US009146724B2

(12) United States Patent
Chancey et al.

(10) Patent No.: US 9,146,724 B2
(45) Date of Patent: *Sep. 29, 2015

(54) GENERATING AND USING CONSTRAINTS ASSOCIATED WITH SOFTWARE RELATED PRODUCTS

(71) Applicant: International Business Machines Corporation, Armonk, NY (US)

(72) Inventors: Raphael P. Chancey, Leander, TX (US); Lei He, Beijing (CN); Eduardo T. Kahan, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,639

(22) Filed: Oct. 13, 2014

(65) Prior Publication Data

US 2015/0033218 A1    Jan. 29, 2015

Related U.S. Application Data

(63) Continuation of application No. 13/795,662, filed on Mar. 12, 2013, now Pat. No. 8,918,796, which is a continuation of application No. 13/228,080, filed on Sep. 8, 2011, now Pat. No. 8,438,576, which is a continuation of application No. 11/853,975, filed on Sep. 12, 2007, now Pat. No. 8,046,771.

(51) Int. Cl.
*G06F 3/00* (2006.01)
*G06F 9/445* (2006.01)
*G06F 9/54* (2006.01)

(52) U.S. Cl.
CPC .. *G06F 8/61* (2013.01); *G06F 9/54* (2013.01); *G06F 9/546* (2013.01)

(58) Field of Classification Search
CPC .............. G06F 9/54; G06F 9/546; G06F 8/61
See application file for complete search history.

(56) References Cited

U.S. PATENT DOCUMENTS 5,138,712 A    8/1992  Corbin
5,721,902 A *  2/1998  Schultz ................................ 1/1
5,758,083 A *  5/1998  Singh et al. .................... 709/223

(Continued)

OTHER PUBLICATIONS

Dennis Heimbigner, Deploying Component Software Systems, 1998.*
Allen, "Managing Multiple XML Schemas in the UK's Inland Revenue," Proceedings of XML Europe 2003, May 2003, 10 pages.
Hall et al., "Specifying the Deployable Software Description Formal in XML," Technical Report CU-SERL-207-99, University of Colorado Software Engineering Research Laboratory, Mar. 1999, 17 pages.

(Continued)

*Primary Examiner* — Lechi Truong
(74) *Attorney, Agent, or Firm* — Yee & Associates, P.C.; William J. Stock

(57) ABSTRACT

A computer implemented method and apparatus is provided for generating and using constraints that are associated with software programs or other software entities intended for use in a specified data processing system or environment. One embodiment is directed to a method that includes the step of extracting metadata pertaining to the one or more software programs from at least one database. The extracted metadata is selectively processed to generate a set of constraints that affect the use of the one or more programs in a specified environment, wherein such processing includes transforming the extracted metadata to provide the set of constraints in a prespecified constraint language. The method further comprises detecting a proposed action of a user that is associated with the one or more software programs, and determining whether the proposed action violates any constraint in the set.

15 Claims, 4 Drawing Sheets

(56) References Cited

U.S. PATENT DOCUMENTS

| | | | | |
|---|---|---|---|---|
| 5,768,539 | A | * | 6/1998 | Metz et al. .................... 709/249 |
| 5,813,042 | A | * | 9/1998 | Campbell et al. ............. 711/159 |
| 6,278,454 | B1 | | 8/2001 | Krishnana |
| 6,351,850 | B1 | | 2/2002 | van Guilluwe et al. |
| 6,611,845 | B1 | | 8/2003 | Dockter et al. |
| 6,675,382 | B1 | | 1/2004 | Foster |
| 7,047,168 | B2 | | 5/2006 | Carballo et al. |
| 7,200,805 | B2 | | 4/2007 | Carlson et al. |
| 7,748,000 | B2 | * | 6/2010 | Genty et al. .................. 717/176 |
| 7,823,120 | B2 | | 10/2010 | Kazakov et al. |
| 7,890,951 | B2 | | 2/2011 | Vinberg |
| 8,046,771 | B2 | | 10/2011 | Chancey et al. |
| 8,438,576 | B2 | | 5/2013 | Chancey et al. |
| 2004/0158567 | A1 | | 8/2004 | Dettinger et al. |
| 2005/0125371 | A1 | | 6/2005 | Bhide et al. |
| 2005/0198612 | A1 | | 9/2005 | Gonzalez |
| 2006/0136470 | A1 | | 6/2006 | Dettinger et al. |
| 2006/0206440 | A1 | | 9/2006 | Anderson et al. |
| 2006/0253495 | A1 | | 11/2006 | Png |
| 2006/0253830 | A1 | | 11/2006 | Rajanala et al. |
| 2007/0011167 | A1 | | 1/2007 | Krishnaprasad et al. |
| 2007/0056018 | A1 | * | 3/2007 | Ridlon et al. .................... 726/1 |
| 2009/0070777 | A1 | | 3/2009 | Chancey et al. |
| 2011/0321036 | A1 | | 12/2011 | Chancey et al. |
| 2013/0198735 | A1 | | 8/2013 | Chancey et al. |

OTHER PUBLICATIONS

Lehman et al., "Rules and Tools for Software Evolution Planning and Management," Annals of Software Engineering, vol. 11, No. 1, Nov. 2001, pp. 15-44.

Sahai et al., "Automated Generation of Resource Configurations through Policies," Proceedings of the Fifth IEEE International Workshop on Policies for Distributed Systems and Networks (POLICY'04), Jun. 2004, 4 pages.

Office Action, dated Dec. 7, 2010, regarding U.S. Appl. No. 11/853,975, 15 pages.

Notice of Allowance, dated Jun. 17, 2011, regarding U.S. Appl. No. 11/853,975, 15 pages.

Office Action, dated May 31, 2012, regarding U.S. Appl. No. 13/228,080, 18 pages.

Final Office Action, dated Oct. 16, 2012, regarding U.S. Appl. No. 13/228,080, 14 pages.

Notice of Allowance, dated Jan. 3, 2013, regarding U.S. Appl. No. 13/228,080, 9 pages.

Office Action, dated May 22, 2014, regarding U.S. Appl. No. 13/795,662, 21 pages.

Notice of Allowance, dated Aug. 18, 2014, regarding U.S. Appl. No. 13/795,662, 11 pages.

* cited by examiner

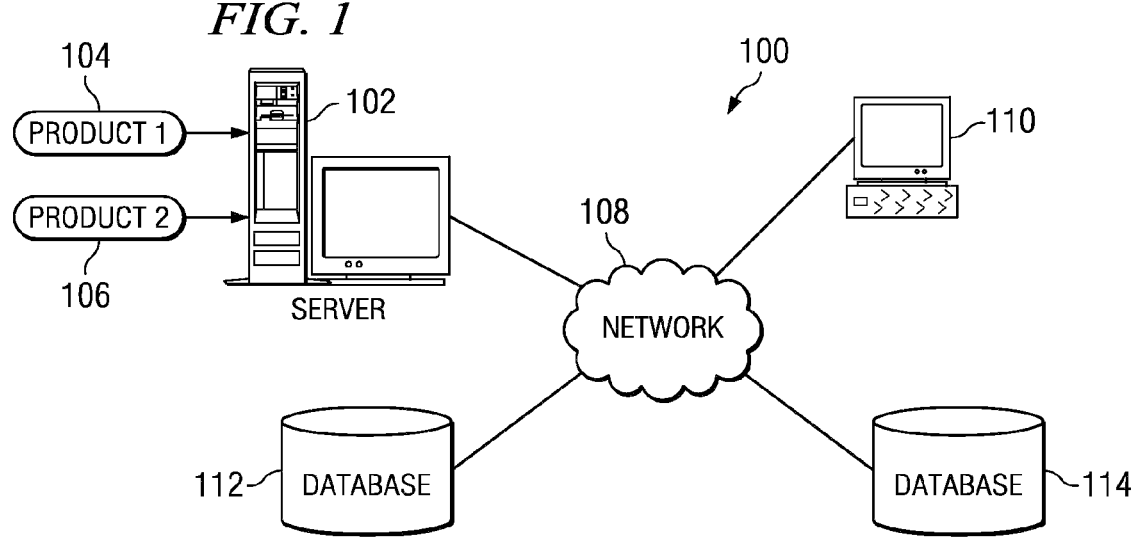
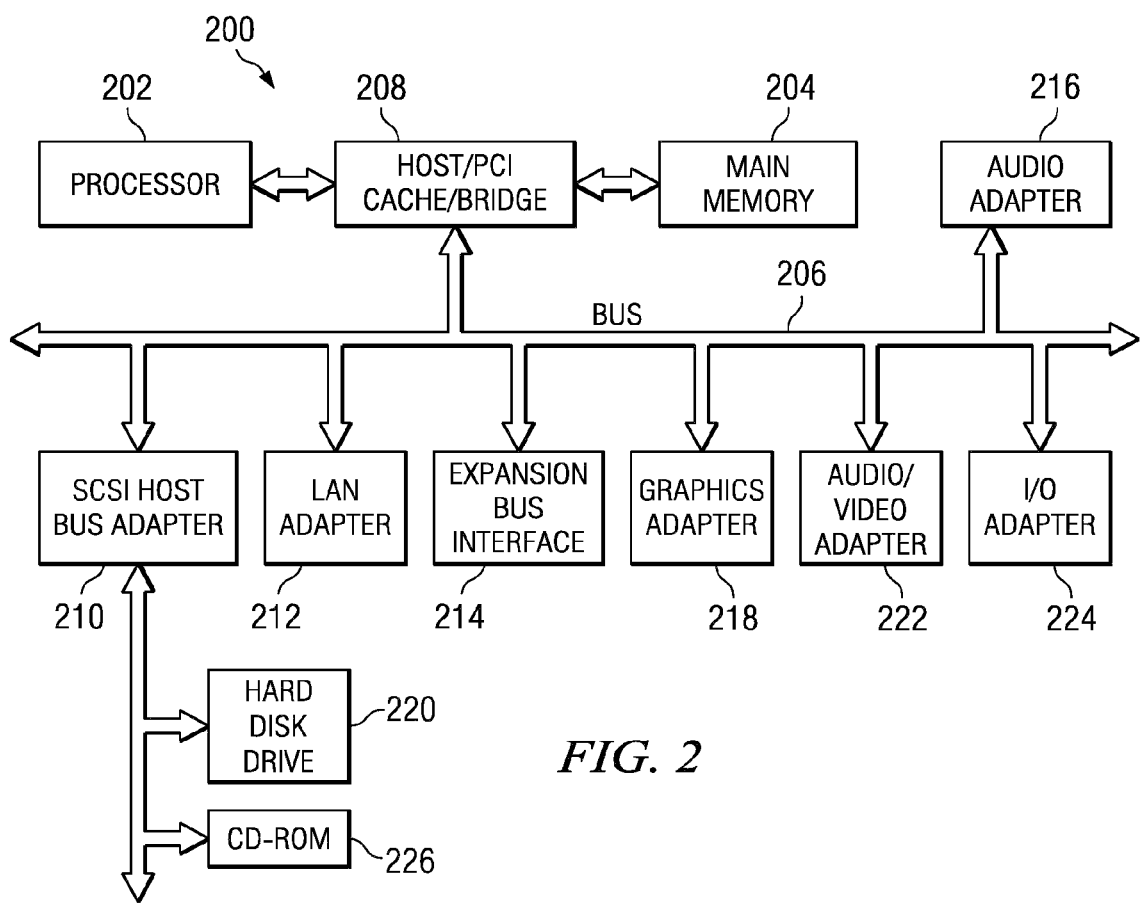

GENERATING AND USING CONSTRAINTS ASSOCIATED WITH SOFTWARE RELATED PRODUCTS

This application is a continuation of U.S. patent application Ser. No. 13/795,662, filed Mar. 12, 2013, which is a continuation of U.S. patent application Ser. No. 13/228,080, filed Sep. 8, 2011, now U.S. Pat. No. 8,438,576, issued on May 7, 2013, which is a continuation of U.S. patent application Ser. No. 11/853,975, filed Sep. 12, 2007, now U.S. Pat. No. 8,046,771, issued on Oct. 25, 2011. The entire contents of these applications are incorporated herein by reference.

BACKGROUND OF THE INVENTION

1. Field of the Invention

The invention disclosed and claimed herein generally pertains to a method for generating and using constraints associated with the installation or use of software related products in a data processing system. More particularly, the invention pertains to a method of the above type wherein respective constraints are generated from product metadata that is available in one or more databases. Even more particularly, the invention pertains to a method of the above type wherein respective constraints can be used to determine whether or not a product use or installation will result in a fault condition.

2. Description of the Related Art

It is well understood that when a software product is installed, it can only be run on a machine or platform that is capable of supporting it. Typically, such products, or components included within such products, have minimum requirements or constraints that must always be met, both for installation and for subsequent operation. These constraints may include the amount of disk space that is needed, the types of memory that can be used and other minimum hardware requirements.

As an example, WebSphere software products are products of the International Business Machines Corporation (IBM), wherein WebSphere is a registered trademark of IBM. WebSphere products can only be run on certain specified platforms, so that a large number of constraints apply thereto. Moreover, if an installation includes two or more software products that must work together, further constraints are imposed. For example, both of the products may need to be of the same version level, in order to enable the two products to communicate with one another. As a further illustration of an important class of constraints, a customer computer may have only a dial-up Internet connection, and not a DSL or other high speed connection. Thus, an application that required a high speed connection could not be used on the customer computer.

Minimum requirements and other constraints for software related products are generally available in various databases, and may also be found in manuals and other hard copy materials. Accordingly, when such information is needed, it is manually accessed from these types of sources. This may require little effort if only a small amount of information is needed, such as the version number that is required for a particular product operating system. Very often, however, a substantial amount of requirement-related information must be found and accessed. This is nearly always the case, when it is necessary to identify all the constraints that apply to installation of a complex software system or configuration. All such constraints must be discovered and complied with, in order to ensure that the system is correctly installed and properly used. At present, an efficient and automated mechanism for acquiring all relevant constraint information for a complex system is generally not available. As a result, such acquisition tasks tend to be very tedious and time consuming.

SUMMARY OF THE INVENTION

Embodiments of the invention generate and use constraints that are associated with one or more computer or software programs or like entities or components, wherein the software programs are intended for use in a specified data processing system or environment. One such embodiment is directed to a method that includes the step of extracting metadata pertaining to the one or more software programs from at least one database. The extracted metadata is selectively processed, in order to generate a set of constraints that affect the use of the one or more programs in a specified environment. Such processing includes transforming the extracted metadata, to provide the set of constraints in a prespecified constraint language. The method further comprises detecting a proposed action of a user that is associated with the one or more programs, and determining whether the proposed action would violate any constraint in the set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram showing a network configuration in which an embodiment of the invention may be used or implemented.

FIG. 2 is a block diagram showing a computer system for the network of FIG. 1 that may be used in implementing an embodiment of the invention.

DETAILED DESCRIPTION OF THE PREFERRED EMBODIMENT

Figure 3:
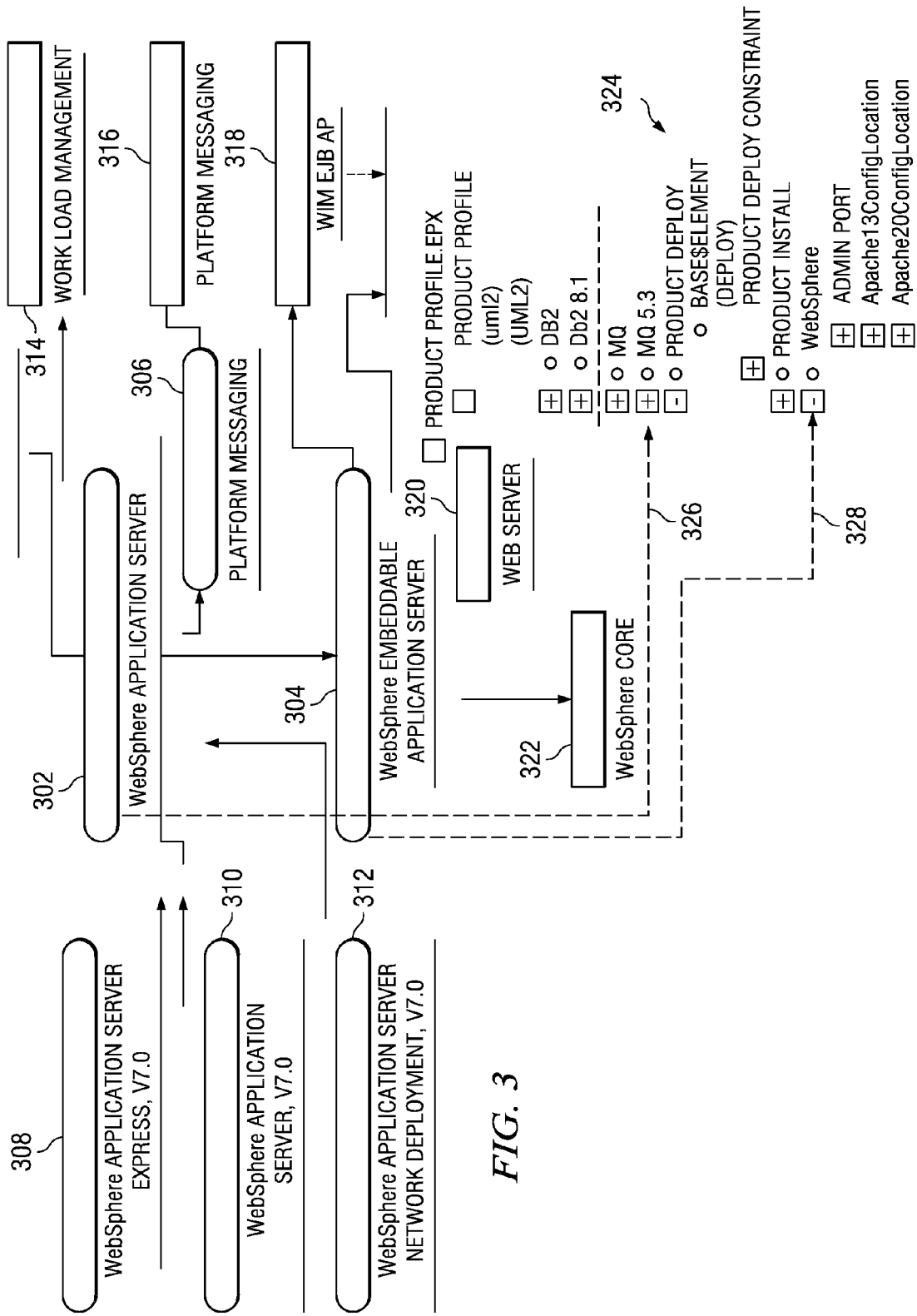
FIG. 3 is a schematic diagram illustrating exemplary software product constraints, with which an embodiment of the invention may be concerned.

Referring to FIG. 1, there is shown a network configuration 100 that may be used in implementing an embodiment of the invention. The network 100 includes a data processing system 102, wherein a first software product 104 (Product 1) is to be installed and run on system 104. In some embodiments, it is desired to also a run a second software product 106 (Product 2) on system 102, wherein the product 106 must be able to communicate with and run together with the software product 104. It is anticipated that installation of either or both products on the platform defined by system 102 will need to comply with various constraints and requirements. Data for use in determining such constraints may be located in data processing system 102 and/or in one or both of the exemplary databases 112 and 114.

Referring further to FIG. 1, there is shown a computer system 110 connected to system 102 and databases 112 and 114 by means of a network 108, such as the Internet or a local area network (LAN). Computer system 110 is configured to carry out a procedure in accordance with an embodiment of the invention, as described hereinafter in further detail, to determine respective constraints that apply to installation and use of products 104 and 106. The procedure includes searching system 102 and databases such as 112 and 114 for pertinent metadata, and then selectively processing the data to provide the pertinent constraints.

Referring to FIG. 2, there is shown a block diagram of a generalized data processing system 200 which may be used as computer system 110 to implement embodiments of the present invention. Data processing system 200 exemplifies a computer in which code or instructions for implementing the processes of the present invention may be located. Data processing system 200 usefully employs a peripheral component interconnect (PCI) local bus architecture. FIG. 2 shows a processor 202 and main memory 204 connected to a PCI local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 222 are connected to PCI local bus 206 by means of add-in boards inserted into expansion slots. One or more I/O adapters 224 may also be inserted into PCI bus 206 as plug-in devices. SCSI host bus adapter 210 provides a connection for hard disk drive 220, and also for CD-ROM drive 226.

An operating system runs on processor 202 and is used to coordinate and provide control of various components within data processing system 200 shown in FIG. 2. The operating system, which may be a commercially available operating system, is loaded into system 200 by Open Firmware. Instructions for the operating system and for applications or programs are located on storage devices, such as hard disk drive 220, and may be loaded into main memory 204 for execution by processor 202.

Referring to FIG. 3, there is shown a simplified schematic representation depicting three WebSphere product versions 302, 304 and 306, and the relationships therebetween. The product versions 302-306 are respectively referred to as the WebSphere Application Server, the WebSphere Embeddable Application Server and Platform Messaging. Version 302 is the most complete product version, and when installed includes both product versions 304 and 306. Version 302 further includes the WebSphere Application Servers 308, 310 and 312, as well as components 314-322. These components are respectively referred to as Work Load Management 314, Platform Messaging 316, WIM EJB AP 318, Web Server 320, and WebSphere Core 322. Product 304 is a smaller version of the WebSphere product, and lacks certain of the capabilities included in version 302. For example, version 304 does not have Platform Messaging.

Referring further to FIG. 3, there is shown a logic tree 324 that displays a portion of the data pertaining to product versions 302-306, wherein the logic tree is under the heading Product Profile.epx. This data includes requirements and constraints that apply to the respective product versions 302-306. All of the data shown pertains to version 302, as indicated by arrow 326, whereas only some of the data pertains to version 304, as indicated by arrow 328.

As an illustration of a constraint associated with the Web-Sphere products 302-306 of FIG. 3, logic tree 324 includes the sub-heading AdminPort, under the heading WebSphere. The data accessed by AdminPort identifies the port or ports by number that can be used by an operating system to administer a WebSphere product. For example, if the port was allowed to be either port no. 880 or port no. 980 for a Websphere product, but only port no. 880 was available, use of port no. 880 only would become a constraint for the use of the product.

As a further example of a constraint, the larger product version 302 requires a minimum of 2 gigabytes of memory to support it, whereas version 304 only requires 1 gigabyte. Accordingly, if a platform is able to provide only 1 gigabyte of memory, version 304 can be installed and successfully run on the platform. However, the 2 gigabyte memory requirement of product version 302 acts as a constraint to prevent 302 from being run on the platform.

Another example of a constraint could be the Java version that is required for all the components 314-322. If some of these components could be used with either Java 2 or Java 3, but other of the components could be used only with Java 2, all of the components 314-322 would be constrained to using Java 2.

Figure 4:
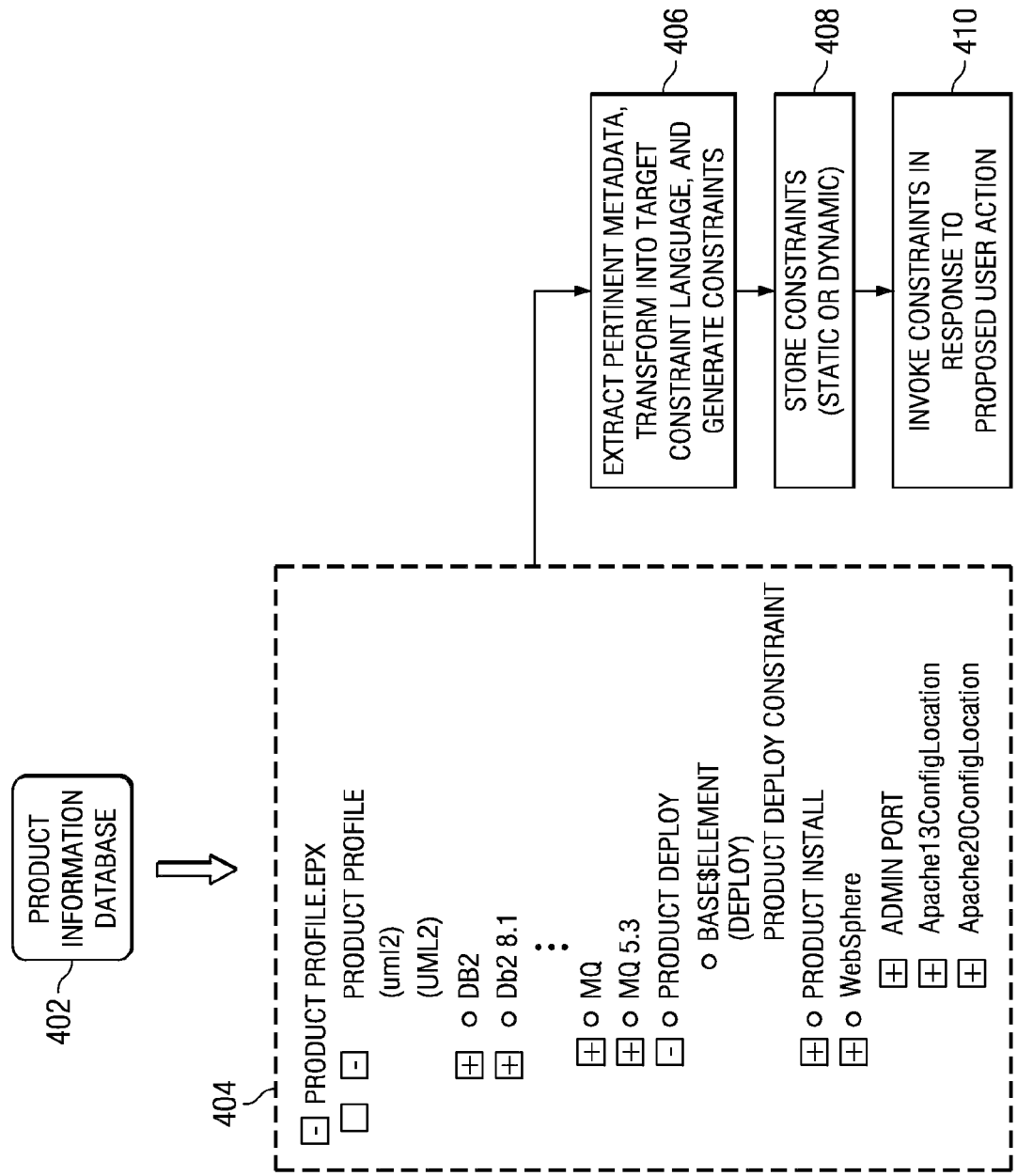
FIG. 4 is a schematic diagram showing a set of functional components for use in implementing an embodiment of the invention.

Referring to FIG. 4, there is shown a database 402 containing product related information, such as information pertaining to the products discussed above in connection with FIG. 3. Database 402 could for example comprise a database 112 or 114, shown in FIG. 1, and could contain data such as the data 404 included in the logic tree 324 of FIG. 3.

Referring further to FIG. 4, there is shown a tooling component 406 that is adapted to use product information from database 402, as well as from other sources, to provide product related constraints. Component 406 achieves this by first defining and extracting pertinent metadata from one or more databases such as database 402. For example, a user could propose to install both Product 1 and Product 2 of FIG. 1 on a platform such as data processing system 102. In this example, pertinent metadata could be defined to include the minimum platform requirements needed by Product 1, the same requirements for Product 2, and the capabilities of system 102 that are relevant to the product requirements (e.g. required memory). Further metadata could include respective product version numbers, or other types of data needed to determine whether Products 1 and 2 can be used together. After defining pertinent metadata, one or more databases are searched to locate such metadata, and it is then extracted or retrieved. It is to be emphasized that in some embodiments, multiple databases, even extending over a large network, could be searched and accessed for pertinent metadata.

After the metadata has been acquired, it is transformed by tooling component 406 into a target constraint language, such as the Unified Modeling Language (UML). UML is a general purpose modeling language that is commonly used for describing software or computer related information in particular forms, such as boxes, squares and the like. Profiles available in UML provide a generic extension mechanism for building models in particular domains. Moreover, information transformed into UML can be stored by means of profile extensions. Thus, product constraints derived from the extracted data can be stored as profiles. These constraints can then be accessed, used and understood by other tooling components that use a language related to UML, such as OCL or Java. This is described hereinafter in further detail.

Tooling component 406 also derives or generates respective constraints, from data furnished by the extracted metadata. This is generally achieved by a process of intersecting the minimum support requirements needed by a product or product component with the requirements or capabilities of other components or platforms. For example, if Product 1 requires a minimum of 1 gigabyte of memory for support, and a platform has a 1.5 gigabyte memory, these two components together define an intersection at 1 gigabyte, which becomes a constraint for installing Product 1 on the platform. On the other hand, if Product 2 requires a minimum of 2 gigabytes of memory for support, this requirement becomes a constraint that prevents Product 2 from being successfully installed on the platform.

FIG. 4 further shows a component 408 for storing respective constraints after they have been generated. In a useful embodiment, constraints are virtually stored, within or by means of UML profiles. They may also be stored on a static basis, that is, over a period of time. Thus, in a static mode, metadata is acquired, respective constraints are generated therefrom, and transformed into UML or other language, and the constraints are then retained in a data repository until needed. As described above, the constraints may be stored in the form of UML profiles.

Alternatively, constraints may be generated in a dynamic mode, that is, only when they are specifically needed. In this case, in response to a proposed user action involving product constraints, pertinent metadata would be retrieved from the database in real time. The metadata would be used to generate constraints that would be stored only briefly, in the course of providing a response to the proposed user action.

Referring further to FIG. 4, there is shown a component 410 that responds to a proposed user action in accordance with respective constraints that relate to the proposed action. For example, a user could inform his computer system that he wanted to install a particular software product or component onto a specified platform. Constraints that could affect such installation would then be provided as described above, and would be invoked at component 410. More particularly, component 410 would determine whether the proposed installation was allowed, or would violate any related constraint. If allowed, component 410 would enable the proposed installation, or other user action, to be carried out. On the other hand, if the proposed action would violate a constraint or cause a fault, the user would be notified of such fault result.

One useful technique for providing notice of an intended or proposed user action, in order to initiate the above procedure, is described hereinafter in connection with FIG. 6.

Component 410 could usefully be implemented by transforming respective constraints into Java code, or into Object Constraint Language (OCL). OCL is a declarative language for describing rules that apply to UML models. Thus, OCL is well adapted to provide constraints or rules that were derived from database metadata, and transformed into UML as described above. Using Java code, a constraint could be rendered into a piece of code and made available for use when needed in a system such as computer system 110.

Figure 5:
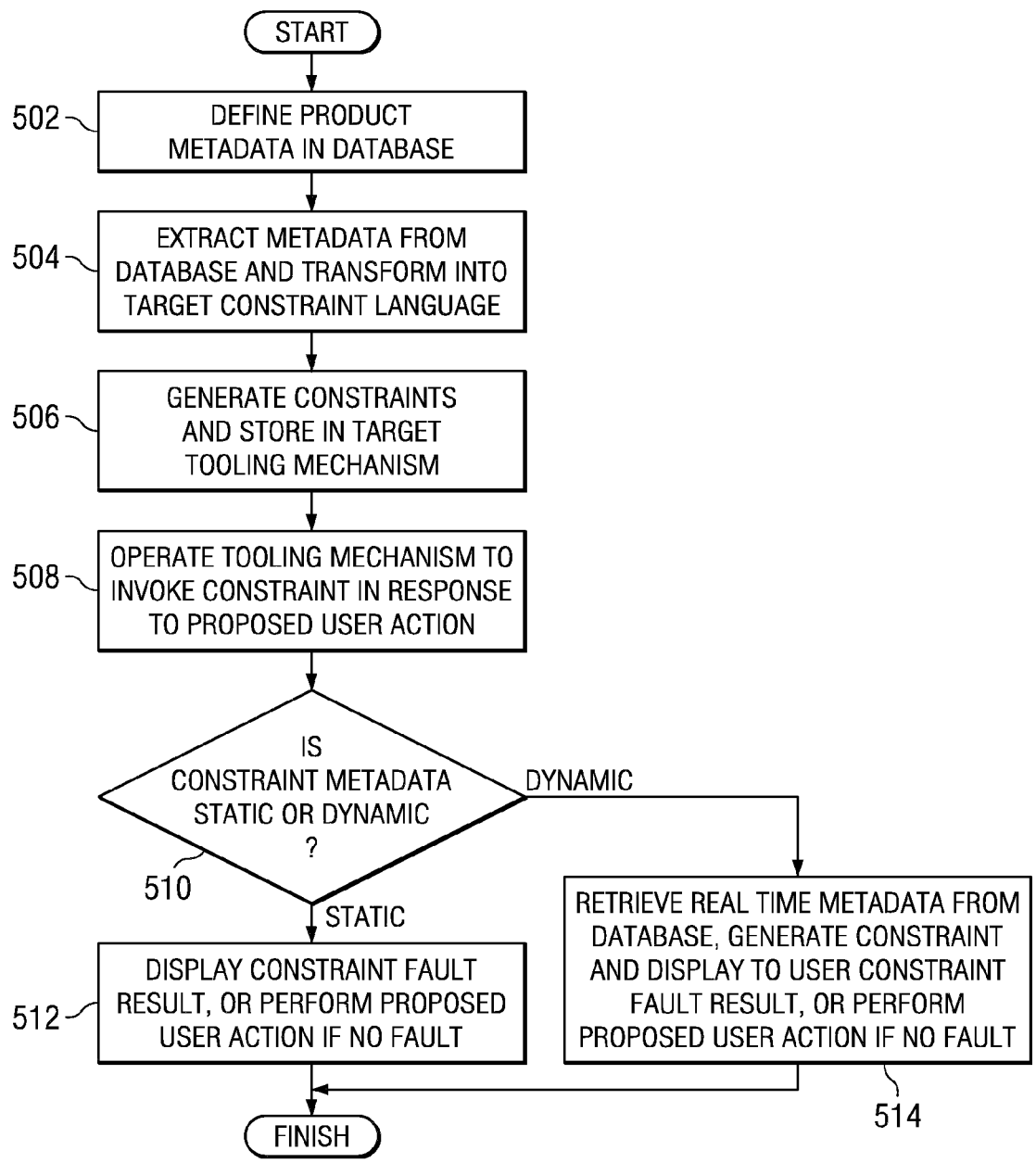
FIG. 5 is a flowchart showing principal steps for an embodiment of the invention.

Referring to FIG. 5, there is shown a flowchart depicting principal steps of a method in accordance with an embodiment of the invention, as described above. At respective steps 502 and 504, product metadata is defined, and is then extracted from a database and transformed into a target constraint language. At step 506, constraints are generated and stored. A tooling mechanism, usefully comprising the components 406-410 shown in FIG. 4, is operated at step 508 to invoke one or more constraints in response to a proposed user action.

Referring further to FIG. 5, at step 510 it is necessary to determine whether the metadata for generating a set of constraints is acquired on a static or dynamic basis, as described above. If constraint metadata is static, that is, was previously acquired, the constraints have already been derived and are stored in a list or the like that is currently available. Accordingly, the method proceeds to step 512. At step 512, if the constraint indicates that the proposed action would result in a fault, the user is so notified. Otherwise, the proposed action may be performed.

If it is determined at step 510 that the constraint metadata is to be acquired on a dynamic basis, step 514 is carried out. In accordance therewith, metadata is retrieved from the database in real time, and used to generate the constraints. Depending on the effect of the constraints, the user is either notified that the proposed action would result in a fault, or else the proposed action is performed.

Figure 6:
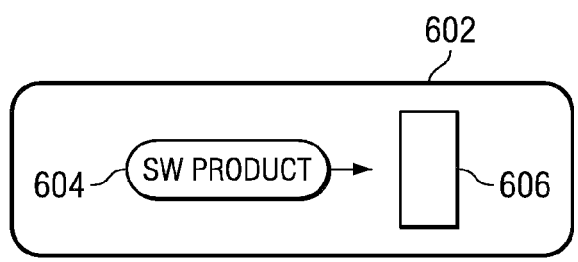
FIG. 6 is a schematic diagram depicting graphical elements on a computer display for use with an embodiment of the invention.

Referring to FIG. 6, there is shown a computer display 602, such as the display screen for the computer system 110 shown in FIG. 1. The screen 602 displays an icon 604 that represents a particular software product, and also displays an icon 606 that represents a specified platform. A user causes both of the icons to be displayed, when considering installation of the software product of icon 604 on the platform of icon 606. In order to determine the effect of constraints that apply to such installation, the user operates a mouse or the like to drag and drop icon 604 onto icon 606. This action causes computer system 110 to carry out a procedure as described above, to determine whether a fault would result from the proposed installation, in view of all pertinent constraints. In one implementation, respective icons could be associated with constraints that are stored in the form of Java code. In an alternative arrangement, rather than dragging and dropping, the procedure could be initiated by extending a line between the icons 604 and 606.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method comprising:
    extracting first metadata from at least one database, wherein the first metadata describe a first set of constraints that apply to installation of a first software program on a data processing system;
    extracting second metadata from the at least one database, wherein the second metadata describe a second set of constraints that apply to installation of a second software program on the data processing system;
    generating a third set of constraints from the first metadata and the second metadata, wherein the third set of constraints comprise an intersection of the first set of constraints and the second set of constraints;
    determining whether installation of both the first program and the second program on the data processing system violates any constraint contained in the third set of constraints;
    generating a user interface notification in response to determining that the installation violates any constraint in the third set of constraints; and
    transforming the first metadata and the second metadata into a constraint language selected from a group of languages consisting of: unified modeling language (UML), object constraint language (OCL), and JAVA.

2. The method of claim 1 further comprising:
    extracting the first metadata and the second metadata from one or more information trees that specify one or more minimum requirements for use of the first software program and the second software program.

3. The method of claim 1, wherein the intersection defines a minimum constraint for installation of both the first software program and the second software program on the data processing system.

4. The method of claim 1 further comprising:
    extracting the first metadata and the second metadata on a static or dynamic basis.

5. The method of claim 4 further comprising:
    responsive to extracting the first metadata and the second metadata on a static basis, accessing the first metadata and the second metadata from a specified storage location.

6. The method of claim 4 further comprising:
    responsive to extracting the first metadata and the second metadata on a dynamic basis, extracting the first metadata and the second metadata from the at least one database in real time.

7. The method of claim 1, wherein the first software program and the second software program interact with one another.

8. A computer implemented method comprising:
    extracting first metadata from at least one database, wherein the first metadata describe a first set of constraints that apply to installation of a first software program on a data processing system;
    extracting second metadata from the at least one database, wherein the second metadata describe a second set of constraints that apply to installation of a second software program on the data processing system;
    generating a third set of constraints from the first metadata and the second metadata, wherein the third set of constraints comprise an intersection of the first set of constraints and the second set of constraints;
    determining whether installation of both the first program and the second program on the data processing system violates any constraint contained in the third set of constraints
    generating a user interface notification in response to determining that the installation violates any constraint in the third set of constraints; and
    storing the third set of constraints in a tooling mechanism configured to perform extracting the first metadata, extracting the second metadata, generating the third set of constraints, and determining whether installation violates any constraint.

9. A non-transitory computer readable storage medium storing a set of instructions comprising:
    program instructions to extract first metadata from at least one database, wherein the first metadata describe a first set of constraints that apply to installation of a first software program on a data processing system;
    program instructions to extract second metadata from the at least one database, wherein the second metadata describe a second set of constraints that apply to installation of a second software program on the data processing system;
    program instructions to generate a third set of constraints from the first metadata and the second metadata, wherein the third set of constraints comprise an intersection of the first set of constraints and the second set of constraints;
    program instructions to determine whether installation of both the first program and the second program on the data processing system violates any constraint contained in the third set of constraints;
    program instructions to generate a user interface notification in response to determining that the installation violates any constraint in the third set of constraints; and
    program instructions to transform the first metadata and the second metadata into a constraint language selected from a group of languages consisting of: unified modeling language (UML), object constraint language (OCL), and JAVA.

10. The non-transitory computer readable storage medium of claim 9 further comprising:
    program instructions to extract the first metadata and the second metadata from one or more information trees that specify one or more minimum requirements for use of the first software program and the second software program.

11. The non-transitory computer readable storage medium of claim 9, wherein the intersection defines a minimum constraint for installation of both the first software program and the second software program on the data processing system.

12. The non-transitory computer readable storage medium of claim 9, wherein the first software program and the second software program interact with one another.

13. A data processing system comprising:
a processor;
a bus connected to the processor;
a memory connected to the bus, wherein the memory stores a set of instructions comprising:
program instructions to extract first metadata from at least one database, wherein the first metadata describe a first set of constraints that apply to installation of a first software program on the data processing system;
program instructions to extract second metadata from the at least one database, wherein the second metadata describe a second set of constraints that apply to installation of a second software program on the data processing system;
program instructions to generate a third set of constraints from the first metadata and the second metadata, wherein the third set of constraints comprise an intersection of the first set of constraints and the second set of constraints;
program instructions to determine whether installation of both the first program and the second program on the data processing system violates any constraint contained in the third set of constraints;
program instructions to generate a user interface notification in response to determining that the installation violates any constraint in the third set of constraints; and
program instructions to transform the first metadata and the second metadata into a constraint language selected from a group of languages consisting of: unified modeling language (UML), object constraint language (OCL), and JAVA.

14. The data processing system of claim 13, wherein the set of instructions further comprise:
program instructions to extract the first metadata and the second metadata from one or more information trees that specify one or more minimum requirements for use of the first software program and the second software program.

15. The data processing system of claim 13, wherein the intersection defines a minimum constraint for installation of both the first software program and the second software program on the data processing system, and wherein the first software program and the second software program interact with one another.

* * * * *